United States Patent
Watanabe et al.

(10) Patent No.: US 11,074,936 B2
(45) Date of Patent: Jul. 27, 2021

(54) MAGNETIC DISK DEVICE

(71) Applicants: Kabushiki Kaisha Toshiba, Tokyo (JP); Toshiba Electronic Devices & Storage Corporation, Tokyo (JP)

(72) Inventors: Toru Watanabe, Kawasaki Kanagawa (JP); Takao Furuhashi, Kawasaki Kanagawa (JP); Akihiro Yamazaki, Kawasaki Kanagawa (JP)

(73) Assignees: Kabushiki Kaisha Toshiba, Tokyo (JP); Toshiba Electronic Devices & Storage Corporation, Tokyo (JP)

( * ) Notice: Subject to any disclaimer, the term of this patent is extended or adjusted under 35 U.S.C. 154(b) by 0 days.

(21) Appl. No.: 16/939,447

(22) Filed: Jul. 27, 2020

(65) Prior Publication Data

US 2021/0193178 A1    Jun. 24, 2021

(30) Foreign Application Priority Data

Dec. 24, 2019   (JP) .............................. JP2019-232597

(51) Int. Cl.
  *G11B 19/14*  (2006.01)
  *G11B 5/008*  (2006.01)
  *G11B 5/127*  (2006.01)

(52) U.S. Cl.
  CPC .......... *G11B 19/14* (2013.01); *G11B 5/00878* (2013.01); *G11B 5/1278* (2013.01)

(58) Field of Classification Search
  CPC .... G11B 19/14; G11B 5/00878; G11B 5/1278
  USPC .......................................................... 360/55
  See application file for complete search history.

(56) References Cited

U.S. PATENT DOCUMENTS

| 5,831,781 A | 11/1998 | Okamura |
| 7,068,449 B2 | 6/2006 | Riddering et al. |
| 8,861,126 B1 * | 10/2014 | Kang ..................... G11B 5/607 360/75 |
| 9,607,659 B2 | 3/2017 | Zheng et al. |
| 10,204,650 B1 | 2/2019 | Liu et al. |
| 2006/0044669 A1 | 3/2006 | Shimizu et al. |
| 2007/0217051 A1 * | 9/2007 | Shen .................... G11B 5/6029 360/75 |

(Continued)

FOREIGN PATENT DOCUMENTS

| JP | 3199996 B2 | 8/2001 |
| JP | 2003-7017 A | 1/2003 |
| JP | 2006-73075 A | 3/2006 |

(Continued)

*Primary Examiner* — Allen T Cao
(74) *Attorney, Agent, or Firm* — White & Case LLP (57) ABSTRACT

According to one embodiment, a magnetic disk device includes a magnetic disk, a magnetic head including a read head to read data from the magnetic disk and a write head to write data to the magnetic disk, and a controller configured to control read/write from/to the magnetic disk by the magnetic head. The magnetic head includes a thermal actuator configured to project a head surface of the magnetic head to a recording surface of the magnetic disk, and a detector configured to detect a gap between the head surface and the recording surface of the magnetic disk. The controller controls a degree of projection of the magnetic head to the recording surface by the thermal actuator corresponding to the gap detected by the detector during the read/write.

8 Claims, 11 Drawing Sheets

(56) References Cited

U.S. PATENT DOCUMENTS

2007/0247739 A1 10/2007 Iida
2010/0238585 A1 9/2010 Kang

FOREIGN PATENT DOCUMENTS

| JP | 2007-293948 A | 11/2007 |
| JP | 2009-104720 A | 5/2009 |

\* cited by examiner

MAGNETIC DISK DEVICE

CROSS-REFERENCE TO RELATED APPLICATIONS

This application is based upon and claims the benefit of priority from Japanese Patent Application No. 2019-232597, filed Dec. 24, 2019, the entire contents of which are incorporated herein by reference.

FIELD

Embodiments described herein relate generally to a magnetic disk device.

BACKGROUND

In magnetic disk devices, a gap between a read head/write head and a magnetic disk should be decreased in order to improve the recording density, especially, track recording density of the magnetic disk. There is a known technique to achieve the decrease of gap by providing a thermal actuator with the proximity of the read head/write head on a slider, and operating the read head/write head on the magnetic disk with a certain gap therebetween by the thermal actuator.

The present embodiment would present a magnetic disk device which can improve the recording density of the magnetic disk.

DETAILED DESCRIPTION

In general, according to one embodiment, a magnetic disk device includes a magnetic disk, a magnetic head including a read head to read data from the magnetic disk and a write head to write data to the magnetic disk, and a controller configured to control read/write from/to the magnetic disk by the magnetic head. The magnetic head includes a thermal actuator configured to project a head surface of the magnetic head to a recording surface of the magnetic disk, and a detector configured to detect a gap between the head surface and the recording surface of the magnetic disk. The controller controls a degree of projection of the magnetic head to the recording surface by the thermal actuator corresponding to the gap detected by the detector during the read/write.

Embodiments will be described hereinafter with reference to the accompanying drawings. The disclosure is merely an example, and proper changes within the spirit of the invention, which are easily conceivable by a skilled person, are included in the scope of the invention as a matter of course. In order to make the description clearer, the widths, thicknesses, shapes, etc. of the respective parts are schematically illustrated in the drawings, compared to the actual modes. In the specification and drawings, the same elements as those described in connection with preceding drawings are denoted by like reference numerals, and a detailed description thereof may be omitted.

Initially, explained will be a technique of providing a thermal actuator (hereinafter will be referred to as heater) with the proximity of a write head and a read head on a magnetic head slider, having a head surface including the write head/read head project to a magnetic disk by the heater, and operating the head surface on a recording surface of the magnetic disk with a certain gap therebetween.

Figure 1:
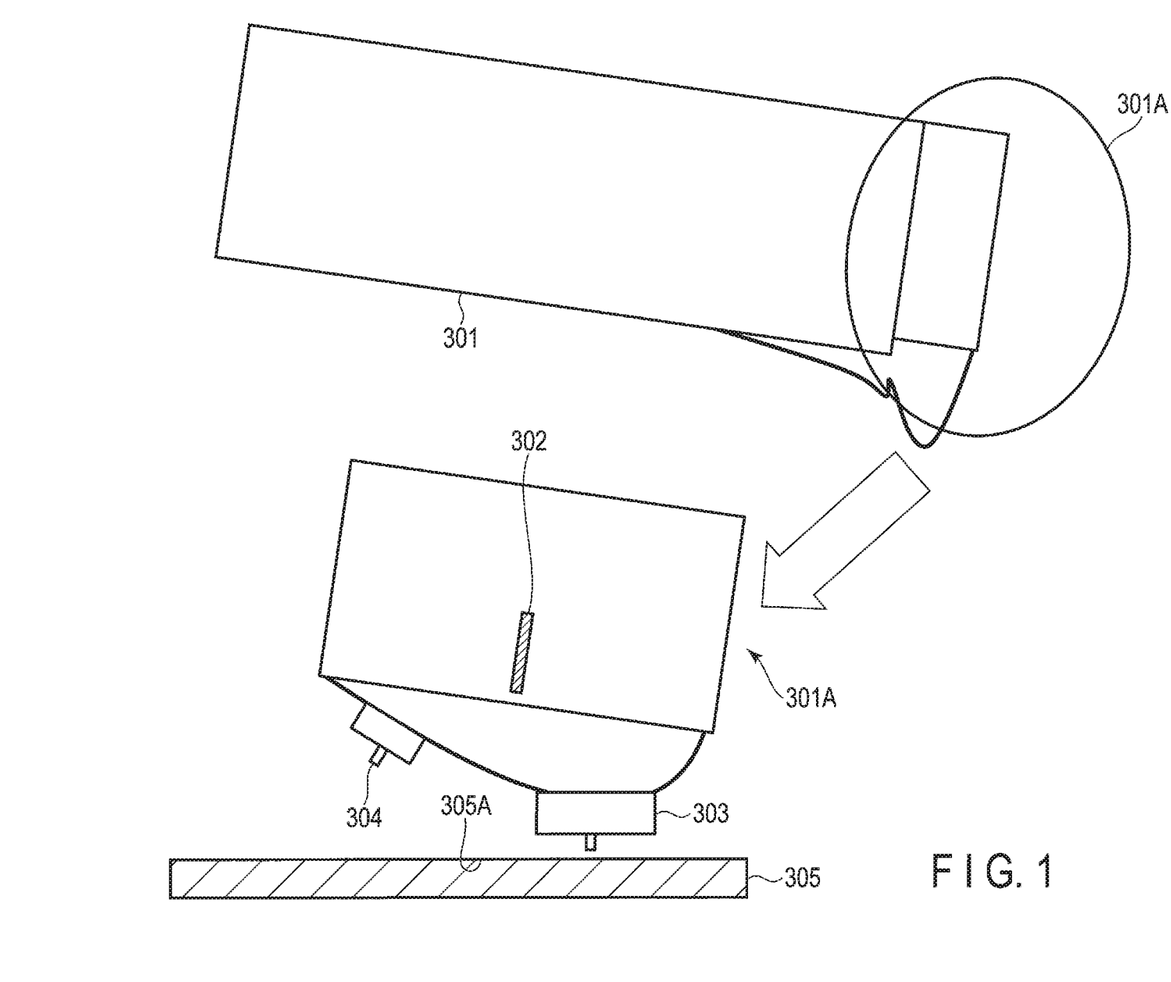
FIG. 1 is a schematic view of a technique of operating a head surface on a recording surface with a certain gap therebetween in a first embodiment.

FIG. 1 is a schematic view of a technique of operating a head surface on a recording surface with a certain gap therebetween.

FIG. 1 indicates a magnetic head slider (hereinafter will be referred to as slider) 301, and a tip 301A of the slider 301 is indicated in an enlarged manner in the part pointed by the arrow. In the tip 301A, a magnetic head including a write head 303 and a read head 304 is disposed such that the head surface thereof faces the recording surface of the magnetic disk 305. Furthermore, a heater 302 is disposed in the proximity of the write head 303 and the read head 304. Upon application of a voltage to the heater 302, the heater 302 is expanded, and the head surface of the write head 303 and the read head 304 is projected to the recording surface of the magnetic disk 305, and thus, a gap between the head surface of the write head 303 and the read head 304 and the recording surface of the magnetic disk 305 is adjusted. Note that the head surface of the write head 303 and the read head 304 is detailed as an air bearing surface (ABS) 9 later with reference to FIG. 4.

In order to adjust the gap with high accuracy, a degree of projection of the head surface of the write head 303 and the read head 304 is increased, the head surface is brought into contact with the recording surface of the magnetic disk 305 for once, a read signal and the like are referred to using a degree of projection at the contact as a reference, and the heater 302 is controlled such that a gap from the recording surface of the magnetic disk 305 becomes a desired degree.

Figure 2:
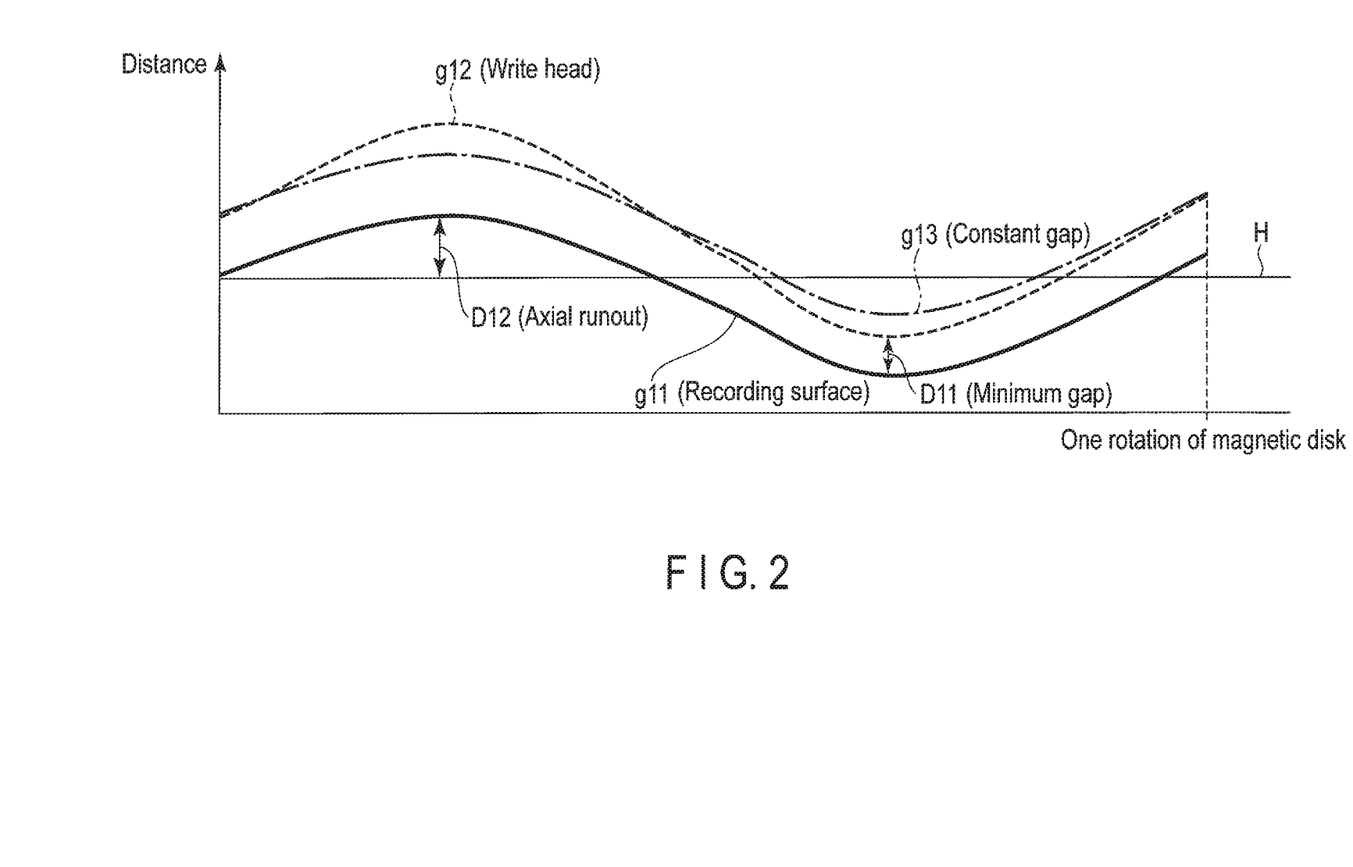
FIG. 2 illustrates an example of a change in the gap between a head surface and a recording surface of a magnetic disk during one rotation of the magnetic disk of the first embodiment.

FIG. 2 illustrates an example of changes between the head surface of the write head 303 and the recording surface of the magnetic disk 305 during one rotation of the magnetic disk 305.

As in FIG. 2, graph g11 indicative of the recording surface of the magnetic disk 305 is not completely flat as depicted by straight line H. Then, the height of the magnetic disk 305 rotated by the spindle motor (described later) changes depending on the position of the slider 301, and a radius of curvature of the magnetic disk 305 changes in one rotation. Here, the slider 301 is pushed onto the recording surface of the magnetic disk 305 by a suspension supporting the same with a constant weight, and when the magnetic disk 305 is rotated, a shear flow is generated in the air between the slider 301 and the magnetic disk 305. Thus, the air is pressurized such that the slider floats above the magnetic disk 305 with a certain gap therebetween. A degree of floating depends on the height of the magnetic disk 305 directly below the slider 301 and the radius of curvature of the magnetic disk 305. As a result, as in FIG. 2, a gap between graph g12 indicative of a distance between the write head 303 and the recording surface and graph g11 indicative of recording surface of the magnetic disk 305 changes within one rotation. That is, as compared to graph g13 indicative of a constant gap, there will be a part where the gap increases and a part where the gap decreases. On the other hand, a reference gap to operate the heater 302 is represented by a minimum gap D11 of FIG. 2, and thus, the average gap is derived as minimum gap+gap change/2. Thus, in order to secure the reliability of the magnetic disk device, for example, preventing wear of the write head 303, and resisting against contamination, a certain value must be maintained as the minimum gap whereas the change in the gap is further decreased in order to improve the recording density of the magnetic disk device.

Hereinafter, a magnetic disk device which can further improve the recording density of the magnetic disk device will be explained.

First Embodiment

Figure 3:
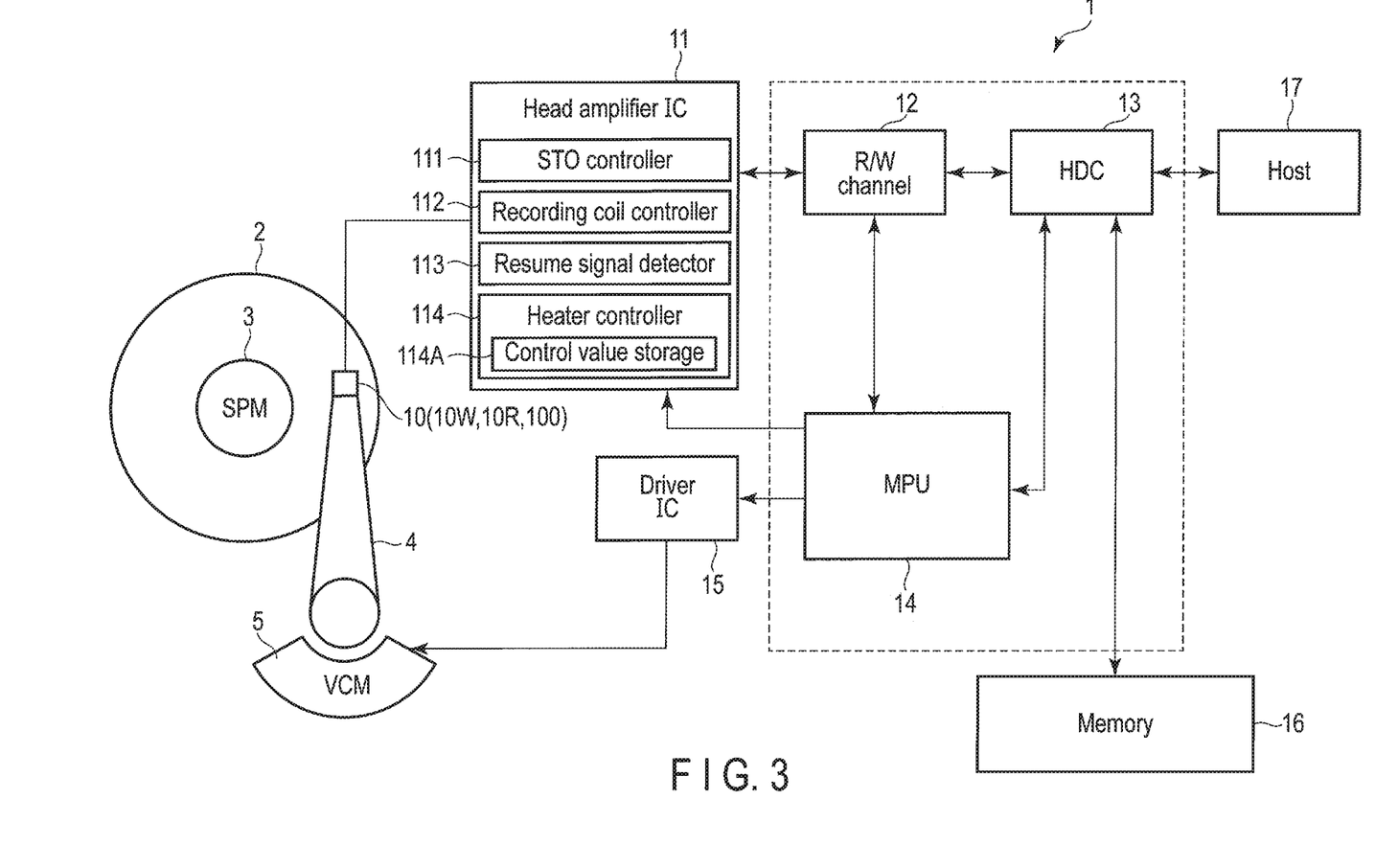
FIG. 3 is a block diagram indicative of an example of the structure of the magnetic disk device of the first embodiment.

FIG. 3 is a block diagram indicative of an example of the structure of a magnetic disk device 1 of a first embodiment.

As in FIG. 3, the magnetic disk device 1 is, for example, a hard disk drive (HDD). The magnetic disk device 1 includes a magnetic disk 2, spindle motor (SPM) 3, actuator 4, voice coil motor (VCM) 5, magnetic head (hereinafter will be referred to as head) 10, head amplifier IC (head amplifier controller) 11, R/W channel 12, hard disk controller (HDC) 13, microprocessor (MPU) 14, driver IC 15, and memory 16.

Furthermore, the magnetic disk device 1 is connectable to a host 17. The head 10 includes, as will be described later, a write head 10W, read head 10R, and spin torque oscillator (STO) 100 which is a high frequency oscillator. Note that the R/W channel 12, HDC 13, and MPU 14 may be incorporated into a one chip integrated circuit.

The magnetic disk 2 includes, for example, a disk-shaped nonmagnetic substrate. On each recording surface of the substrate, there are a soft magnetic layer formed of a soft magnetic material as an underlying layer, and above that, a magnetic recording layer having a magnetic anisotropy in a direction perpendicular to the recording surface, and above that, a protection film layer. A direction to the head 10 is an above direction.

The magnetic disk 2 is fixed to the spindle motor (SPM) 3, and is rotated by the SPM 3 at a certain speed. Note that, instead of a single magnetic disk 2, there may be several magnetic disk 2 disposed on the SPM 3. The SPM 3 is driven by drive current supplied from the driver IC 15 (or drive voltage). A data pattern is recorded to/resumed from the magnetic disk 2 by the head 10.

The actuator 4 is disposed rotatably, and the head 10 is supported at its tip. By rotating the actuator 4 with the voice coil motor (VCM) 5, the head 10 is moved onto a desired track on the magnetic disk 2 to be positioned thereon. The VCM 5 is driven by the drive current (or drive voltage) supplied from the driver IC 15.

The head 10 includes the slider 8, and the write head 10W and the read head 10R formed on the slider 8 (cf. FIG. 2). There are several heads 10 corresponding to the magnetic disk 2. For example, two heads 10 are disposed with respect to the upper surface and the bottom surface of one magnetic disk 2.

The head amplifier IC 11 includes circuits related to drive of the STO 100 and detection of oscillation. The head amplifier IC 11 is disposed between the head 10 and the R/W channel (read/write circuit). Furthermore, the head amplifier IC 11 includes, in the present embodiment, an STO controller 111, recording coil controller 112, resume signal detector 113, and heater controller 114 with a control value storage 114A. The head amplifier IC 11 executes the drive of the STO 100 and the detection of drive signal, for example. Furthermore, the head amplifier IC 11 supplies a write signal (write current) corresponding to write data supplied from the R/W channel 12 to the write head 10W. Furthermore, the head amplifier IC 11 amplifies a read signal output from the read head 10R and transfers the amplified read signal to the R/W channel 12.

The STO controller 111 controls current supplied to the STO 100 of the write head 10W. The recording coil controller 112 controls recording current supplied to a coil of the write head 10W corresponding to a write signal. The resume signal detector 113 detects a signal (read data) read by the read head 10R.

The heater controller 114 controls power supply to a heater 28 which will be described later. That is, the heater controller 114 switches on/off of the heater 28. The heater controller 114 reads a control value set/stored in the control value storage 114 based on a head number or a track, and controls the operation of the heater 28 (described later) based on the read control value. In the present embodiment, the operation of the heater 28 is controlled based on an output corresponding to a gap detected by a gap sensor (detector) 50 which will be described later, in addition to the control output based on the control value.

The R/W channel 12 is a signal processing circuit configured to process signals related to read/write. The R/W channel 12 includes a read channel which executes a signal processing of the read data and a write channel which executes a signal processing of the write data. The R/W channel 12 converts a read signal into digital data, and decodes read data from the digital data. The R/W channel 12 encodes write data transferred from the HDC 13, and transfers the encoded write data to the head amplifier IC 11.

The HDC 13 controls data write to/data read from the magnetic disk 2 using the head 10, head amplifier IC 11, R/W channel 12, and MPU 14. The HDC 13 structures interface between the magnetic disk device 1 and the host 17, and executes transference control of read data and write data. That is, the HDC 13 functions as a host interface controller configured to receive a signal transferred from the host 17 and transfers a signal to the host 17. When the signal is transferred from the host 17, the HDC 13 executes an error correction process of data of recording signal read by the head 10 in accordance with the MPU 14 and decoded. Furthermore, the HDC 13 receives commands (write command, read command, and the like) transferred from the host 17 and transfers the received command to the MPU 14.

The MPU 14 is a main controller of the magnetic disk device 1, and executes a servo control required for controlling of the read/write operation and positioning of the head 10. Note that the magnetic disk 2 stores positioning information, and the servo control to position the magnetic head 10 to a desired position based on the positioning information read by the read head 10R.

The driver IC 15 controls the drive of the SPM 3 and the VCM 5 in accordance with the control of the MPU 14. When the VCM 5 is driven, the head 10 is positioned onto a target track on the magnetic disk 2.

The memory 16 includes a volatile memory and a non-volatile memory. For example, the memory 16 includes a buffer memory which is a DRAM, and a flash memory. The memory 16 stores programs and parameters required for the process of the MPU 14.

Now, the structure of the head 10 will be explained.

Figure 4:
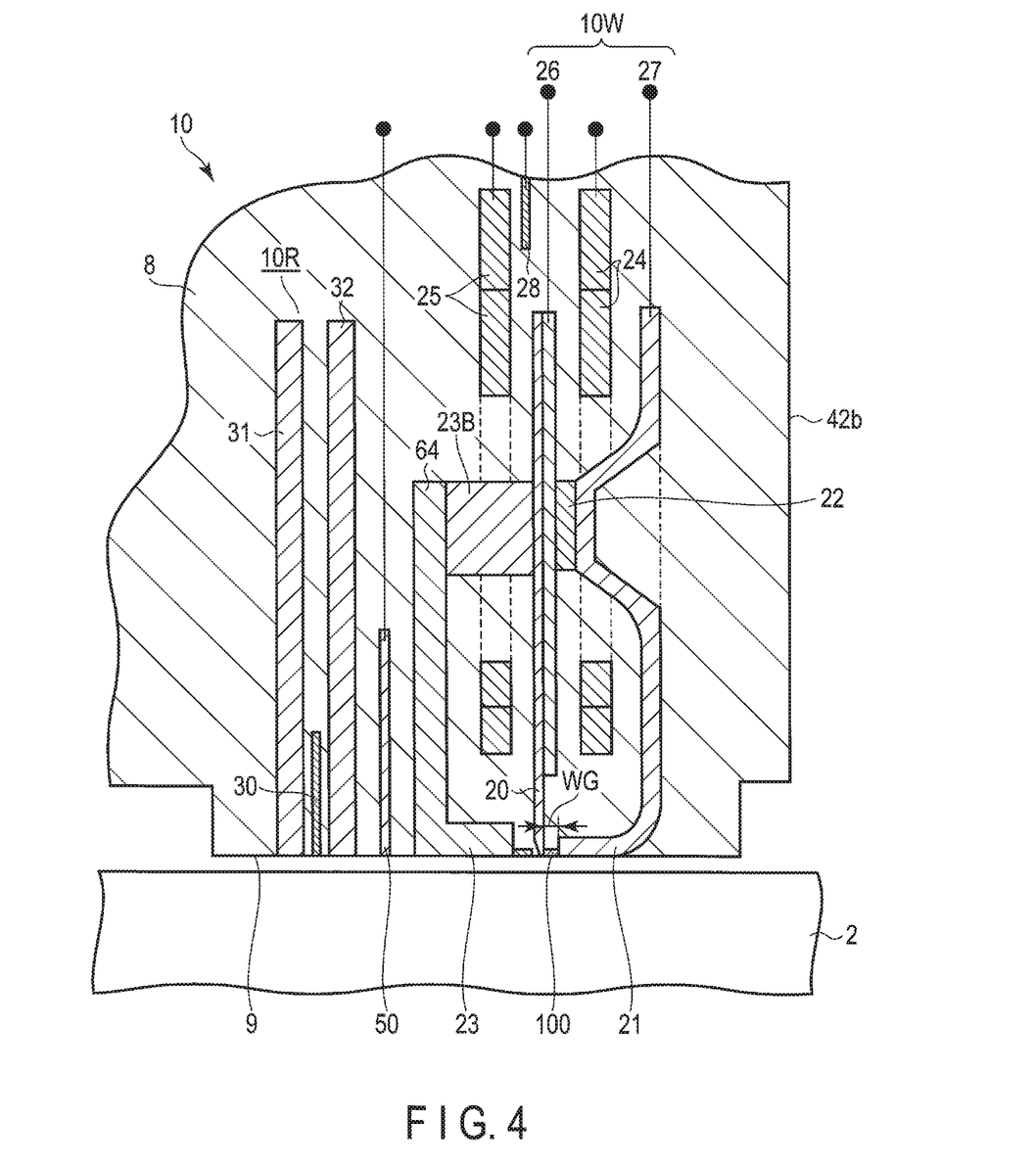
FIG. 4 is a cross-sectional view of an example of the structure of a head of the first embodiment.

FIG. 4 is a cross-sectional view of an example of the structure of the head 10.

FIG. 4 illustrates the head 10 formed as a separate type head including the write head 10W and the read head 10R formed at the tip of the slider 8 through a thin film process. The slider 8 includes an air bearing surface (ABS, or head surface) 9 facing the recording surface of the magnetic disk 2 to be floating over the recording surface of the magnetic disk 2. The write head 10W writes data to the magnetic disk 2. The read head 10R reads data recorded on the magnetic disk 2.

The write head 10W includes a main magnetic pole 20, return magnetic pole 21, nonconductive material 22, reading magnetic pole 23, connector 23B, first recording coil 24, second recording coil 25, first terminal 26, second terminal 27, and STO 100. The main magnetic pole 20, return magnetic pole 21, and reading magnetic pole 23 are formed of a high permeability material. The main magnetic pole 20 and the return magnetic pole 21 structure a first magnetic core forming a closed magnetic circuit, and the first recording coil 24 is wound onto the first magnetic core. Furthermore, the main magnetic pole 20 and the reading magnetic pole 23 structure a second magnetic core forming a closed magnetic circuit, and the second recording coil 25 is wound onto the second magnetic core.

The main magnetic pole 20 generates a recording magnetic field in a direction perpendicular to the recording surface (recording layer) of the magnetic disk 2. The main magnetic pole 20 is formed to extend substantially perpendicular to the recording surface of the magnetic disk 2. The tip of the main magnetic pole 20 in the magnetic disk 2 side is tapered toward to the recording surface. The tip of the main magnetic pole 20 is partly exposed to the ABS 9 of the slider 8. The first terminal 26 is connected to the main magnetic pole 20 for current supply. For example, the first terminal 26 supplies direct current.

The return electrode 21 is formed in a substantial L-letter shape such that the tip in the magnetic disk 2 side bends toward the main magnetic pole 20. The tip of the return magnetic pole 21 faces the tip of the main magnetic pole 20 with a write gap WG therebetween. The return magnetic pole 21 includes a projection at a position apart from the magnetic disk 2, and the projection is connected to the main magnetic pole 20 via the nonconductive material 22. The first recording coil 24 is wound onto the periphery of the projection. A second terminal 27 is connected to the return magnetic pole 21. For example, the second terminal 27 supplies direct current as with the first terminal 26.

The STO 100 is disposed, within the write gap WG, between the tip of the main magnetic pole 20 and the tip of the return magnetic pole 21. The STO 100 is formed as a substantial cuboid of laminated structure with a magnetic material film and a nonmagnetic material film. The surface formed of the tip surface of the main magnetic pole 20, tip surface of the return magnetic pole 21, and STO 100 is exposed to the ABS 9, and is disposed to face the recording surface of the magnetic disk 2. The STO 100 is electrically connected to the main magnetic pole 20 and the return magnetic pole 21 via the nonmagnetic conductive layer. Thus, a conductive circuit which supplies electricity via the main magnetic pole 20, STO 100, and return magnetic pole 21. When current such as direct current is supplied to the STO 100 in the lamination direction, the spin in the ferromagnetic material included in the oscillator gains precession because of the magnetic characteristics of electrons. The STO 100 oscillates in a micro waveband alternate signal (high frequency magnetic field) through the precession. The STO 100 is controlled to be turned on/off by the STO controller 111 and the coil controller 112 in accordance with the control of the MPU 14.

The reading magnetic pole 23 is formed of a soft magnetic material. The reading magnetic pole 23 is disposed, with respect to the main magnetic pole 20, in the opposite side of the return magnetic pole 21, that is, in the reading side of the main magnetic pole 20. The reading magnetic pole 23 is formed in a substantial L-letter shape, and the tip thereof is opposed to the tip of the main magnetic pole 20 with a gap therebetween. The upper end of the reading magnetic pole 23 which is apart from the magnetic disk 2 is connected to the main magnetic pole 20 via the connector 23B formed of a magnetic material. The second recording coil 25 is wound onto the periphery of the connector 23B.

The first recording coil 24 and the second recording coil 25 are wound in the opposite directions. The first recording coil 24 and the second recording coil 25 are connected together via the head amplifier IC 11 in series. The current supply to the first recording coil 24 and the second recording coil 25 is controlled by the recording coil controller 112. Note that the current supply to the first recording coil 24 and the second recording coil 25 may be controlled separately. When alternate current is supplied to the first recording coil 24 and the second recording coil 25, the main magnetic pole 20 is excited.

The read head 10R includes a magnetic film 30 having a magnetic resistance effect, and shield films 31 and 32 holding the magnetic film 30 from its trailing side and reading side. The lower end of the magnetic film 30, and shield films 31 and 32 is exposed on the ABS 9 of the slider 8.

As in FIG. 4, the head 10 includes a heater 28. The heater 28 is embedded in the slider 8. The heater 28 is, for example, disposed between the first recording coil 24 and the second recording coil 25 above the main magnetic pole 20. Note that, in the present embodiment, a case where a single heater 28 is disposed; however, a second heater may be arranged in a side of the shield film 31, for example. Furthermore, three or more heaters may be disposed.

The heater 28 is connected to the heater controller 114 of the head amplifier IC 11. In a write or read operation, a control output based on a control value read from the control value storage 114A corresponding to a desired head number or track with an output based on a gap detected by a gap sensor 50 which will be described later is output to the heater 28. With this power supply, the heater 28 is heated, and the slider 8 part in the proximity thereof is heated accordingly. Thus, the slider 8, write head 10W, and read head 10R are thermal expanded, and the ABS 9 projects to the recording surface side of the magnetic disk 2. Thus, a floating degree of the head 10 (a distance between the head surface of the write head 10W and the read head 10R and the recording surface of the magnetic disk 2, that is, gap therebetween) can be adjusted by the heater 28. That is, a gap between the head 10 and the magnetic disk 2 can be adjusted based on a value of the current supplied (voltage applied) to the heater 28.

Figure 5:
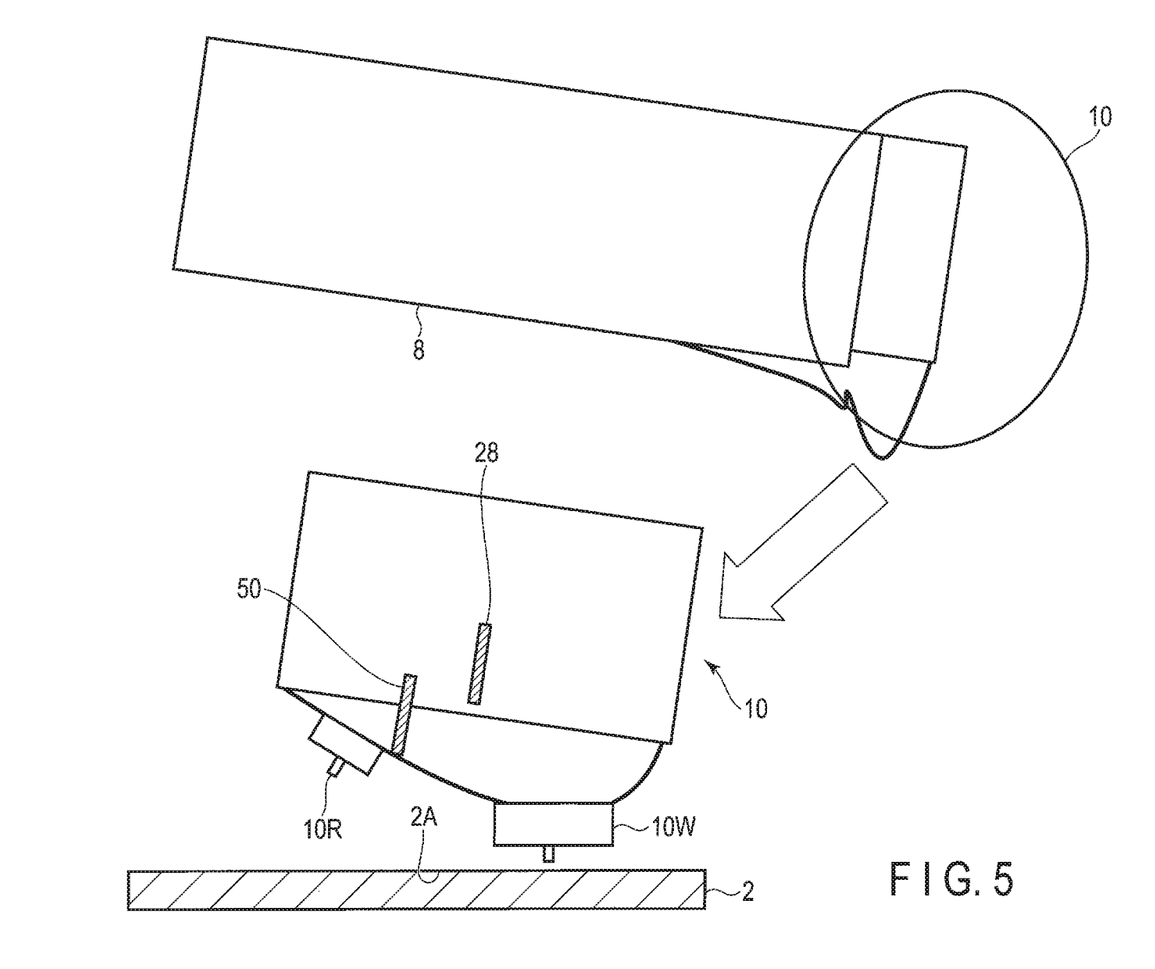
FIG. 5 is a schematic view illustrating a control to maintain a certain gap between the head surface and the recording surface of the magnetic disk of the first embodiment.

FIG. 5 is a schematic view illustrating control to maintain a certain gap between the ABS 9 (head surface) and the recording surface of the magnetic disk 2 in the magnetic disk device 1.

FIG. 5 illustrates the slider 8 and the head 10 disposed on the tip of the slider 8, and the head 10 is depicted in an enlarged manner in the part pointed by the arrow. In the head 10 pointed by the arrow in the figure, a gap sensor 50 is disposed in the proximity of the heater 28. Furthermore, FIG. 5 illustrates a state where the power is supplied to the heater 28 and the ABS 9 (the write head 10W and the read head 10R) is projected to the recording surface 2A of the magnetic disk 2.

The measurement of the distance (that is, gap) between the ABS 9 and the recording surface 2A of the magnetic disk 2 by the gap sensor 50 is performed as follows. The gap sensor 50 is formed of a material having a high temperature coefficient in order to generate heat by supplying constant current to the gap sensor 50 during write/read. Thus, the heater 28 is expanded, and the ABS 9 approaches the recording surface 2A of the magnetic disk 2. When the ABS 9 operates as above, the gap sensor 50 approaches the recording surface 2A of the magnetic disk 2 accordingly. When the gap sensor 50 approaches the recording surface 2A of the magnetic disk 2, the heat of the gap sensor 50 escapes to the magnetic disk 2. When the heat escapes, a resistance value of the gap sensor 50 decreases, and a change in the gap between the magnetic disk 2 and the recording surface 2A is measured using the change in the resistance value. Note that the gap sensor 50 is not limited to a type by which the resistance value is measured, and for example, may be a type by which a capacitance between the ABS 9 and the recording surface 2A of the magnetic disk 2, in which a change in the gap between the ABS 9 and the recording surface 2A of the magnetic disk 2 is measured based on a change in the capacitance.

Figure 6:
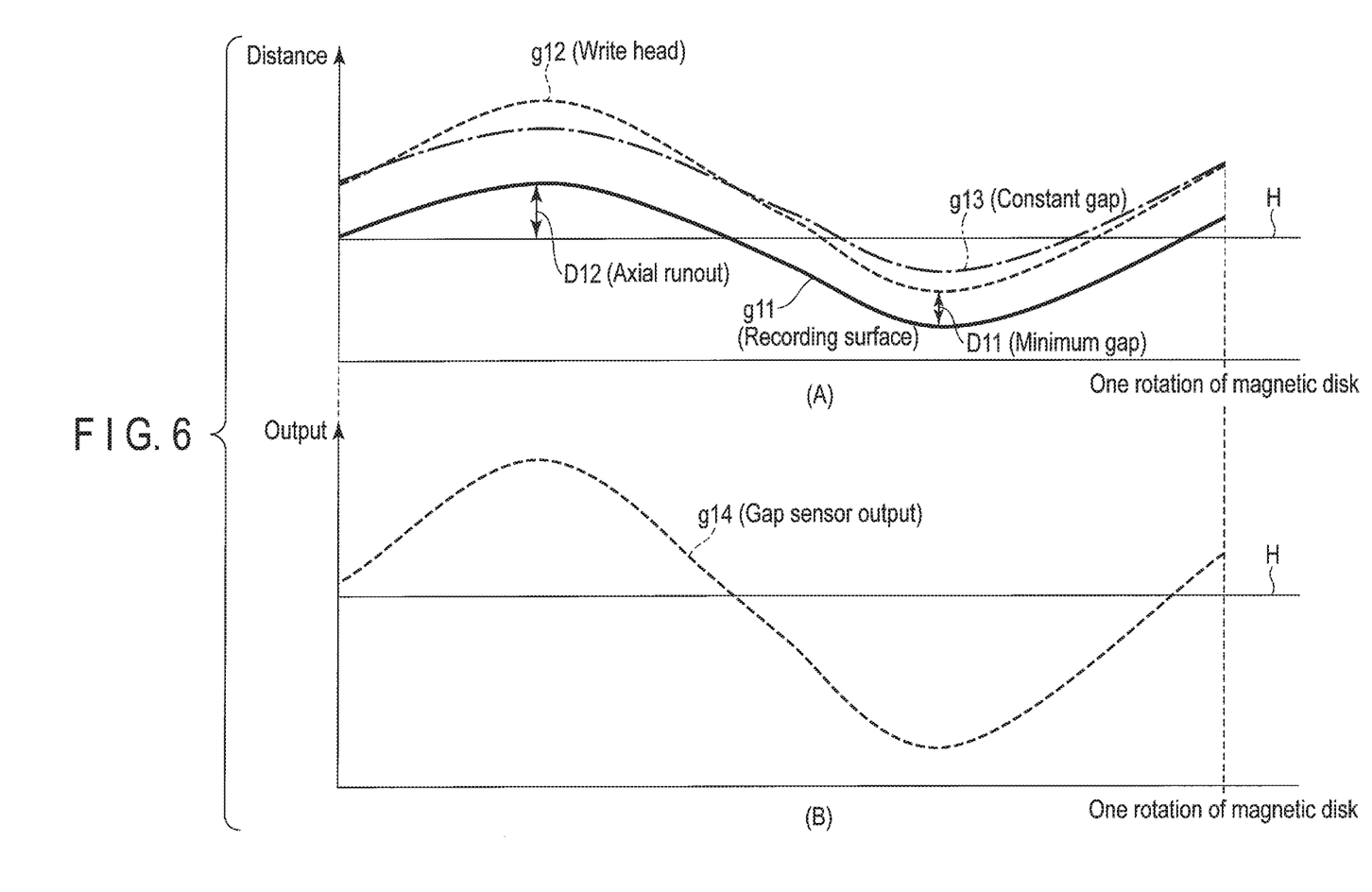
FIG. 6 illustrates an example of an output of a gap sensor in a case where there is a change in a floating degree of the head of the first embodiment.

FIG. 6 illustrates an example of the output of the gap sensor 50 in a case where there is changing in the floating degree of the head 10.

FIG. 6(A) illustrates, as in FIG. 2, an example of changes of gap between the ABS 9 and the recording surface 2A of the magnetic disk 2 during one rotation of the magnetic disk 2. In contrast, FIG. 6(B) illustrates an example of an output of the gap sensor 50 (graph g14) during one rotation of the magnetic disk 2. Comparing graph g12 indicative of a gap between the write head 10W and the recording surface 2A and graph g14 indicative of an output of the gap sensor, the waveforms are apparently similar.

In the present embodiment, based on a size of the signal output from the gap sensor 50, a gain is added to the control value set in the heater 28, and thus, the expansion of the heater 28 is suitably controlled, and a gap between the ABS (head surface) 9 and the recording surface 2A of the magnetic disk 2 is maintained.

Figure 7:
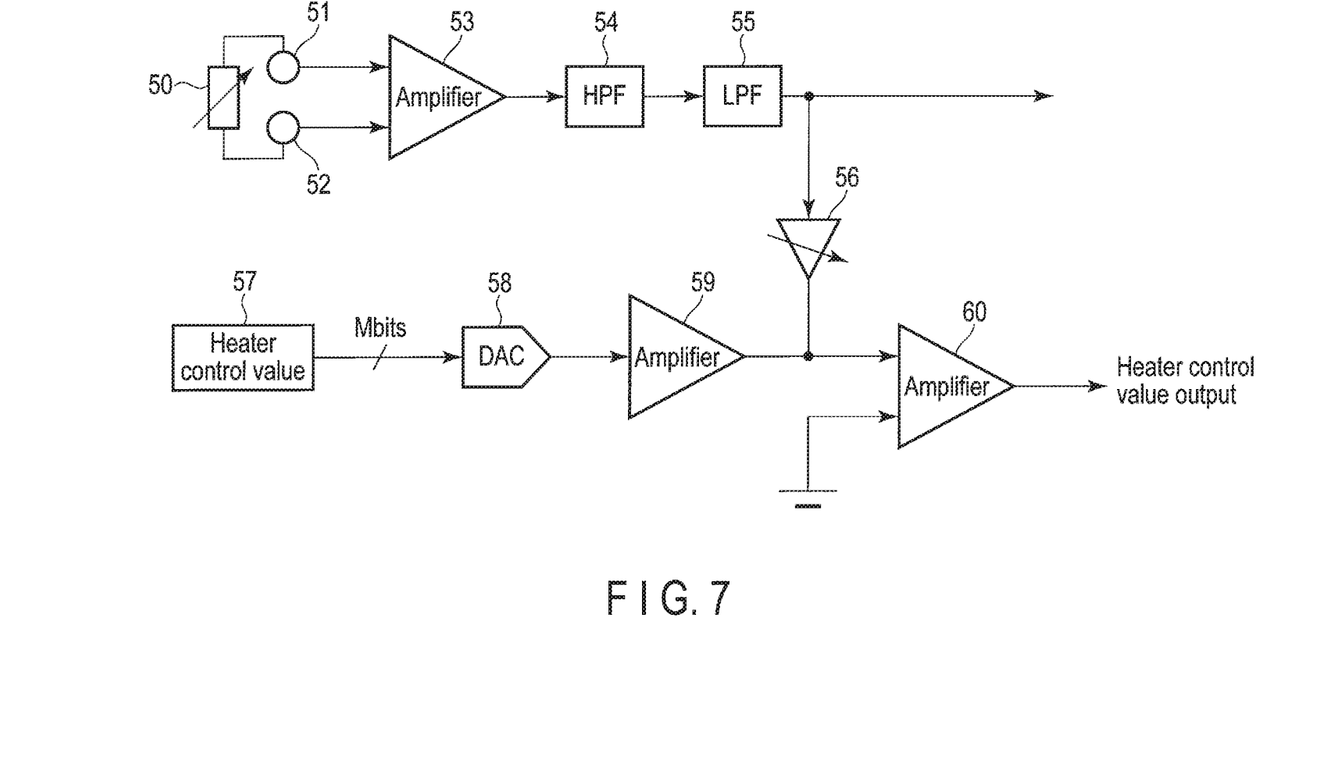
FIG. 7 illustrates an example of the structure of a circuit configured to control a gap between the head surface and the recording surface of the magnetic disk of the first embodiment.

FIG. 7 illustrates an example of the structure of a circuit which controls a gap between the ABS 9 and the recording surface 2A of the magnetic disk 2. In the present embodiment, the circuit is mounted on the head amplifier IC 11; however, the circuit may be disposed in other controller. That is, the circuit should be disposed optionally in the magnetic disk device 1.

The output from the gap sensor 50 is input in an amplifier 53 via terminals 51 and 52. The amplifier 53 amplifies the output from the gap sensor 50. The amplifier 53 amplifies the output of the gap sensor 50 to an integer multiple, for example. The amplified output passes a high pass filter (HPF) 54 and a low pass filter (LPH) 55. Thus, unnecessary frequency components are removed. Then, the output of the gap sensor 50 is input in a gain adjustor 56. The gain adjustor 56 adjusts the gain of the output of the gap sensor 50. Specifically, a gain by which the output change of the gap sensor 50 is minimized is derived by monitoring the output of the gap sensor 50 and changing the value of the gain adjustor 56, and is set in the gain adjustor 56.

On the other hand, the control value 57 of the heater 28 is read from the control value storage 114A corresponding to a number of the head 10 and a positioned track, for example. The read control value of the heater 28 is subjected to the digital/analogue conversion in the digital analogue converter (DAC) 58, and then, is amplified by the amplifier 59.

To the control value of the heater 28 amplified as above by the amplifier 59, the adjusted gain from the gain adjuster 56, that is, the output of the gap sensor 50 is added, and the control value with the output added is output as a control output to control the expansion of the heater 28 from an amplifier 60.

Thus, by the circuit mounted on the head amplifier IC 11, the output of the gap sensor 50 is monitored, and the gain of the gain adjustor 56 is carried corresponding to the output of the gap sensor 50. Then, the gain by which the output change of the gap sensor becomes minimum is added to the control output read from the control value storage 114A in order to minimize the gap between the ABS 9 and the recording surface 2A of the magnetic disk 2 in read/write operation.

Figure 8:
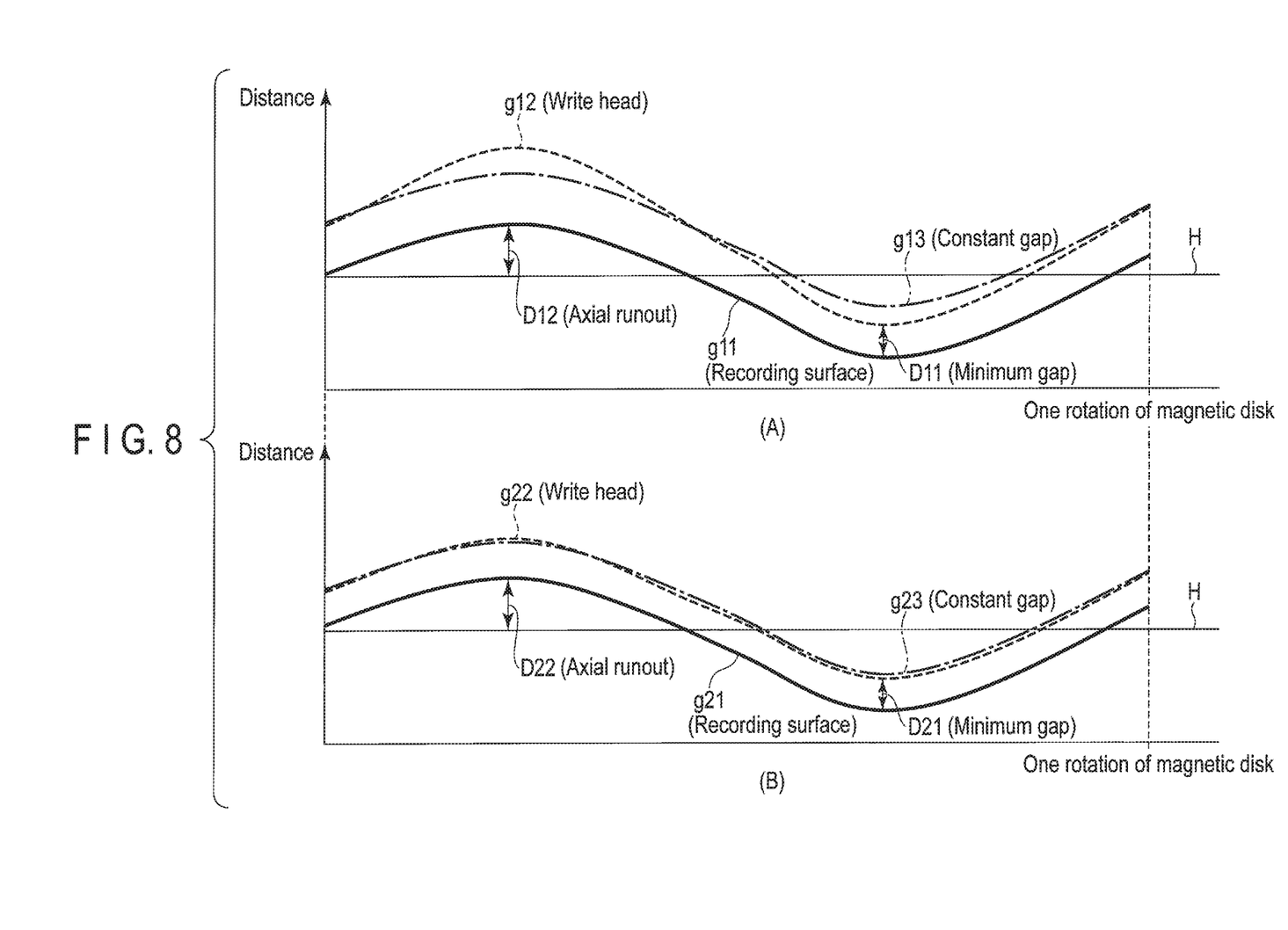
FIG. 8 illustrates an example of a result from adjustment of a control output value of a thermal actuator of the first embodiment.

FIG. 8 illustrates an example of a result of adjustment of the control output value of the heater 28 using the circuit of FIG. 7.

FIG. 8(A) illustrates, as in FIG. 2, an example of changes of the gap with respect to the magnetic disk 2 during one rotation thereof in a case where a control output value of the heater 28 of the present embodiment is not adjusted. In contrast, FIG. 8(B) illustrates an example of changes of the gap with respect to the magnetic disk 2 during one rotation thereof in a case where a control output value of the heater 28 of the present embodiment is adjusted. FIG. 8(B) illustrates graph g21 indicative of the recording surface 2A of the magnetic disk 2, graph g22 indicative of a distance between the write head 10W and the recording surface 2A, and graph g23 indicative of a constant gap. Furthermore, a distance D21 indicative of a minimum gap between graphs g21 and g22, and a distance D22 indicative of an axial runout are shown.

As compared to the case of FIG. 8(A), in the example of FIG. 8(B), a distance between graph g22 indicative of a distance between the write head 10W and the recording surface 2A and graph g23 indicative of a constant gap is substantially equal. Thus, in the write operation, the gap between the ABS 9 and the recording surface 2A of the magnetic disk 2 becomes short while the minimum gap D21 is maintained, and the magnetic disk device 1 can improve the quality of the write/read. Thus, the magnetic disk device 1 can further improve the track recording density. Such an effect can be achieved in the read operation as well.

Second Embodiment

In the first embodiment, an analogue circuit in which a gain derived based on the output of the gap sensor 50 is added to the control output of the heater 28 is used, and in a second embodiment, a digital circuit is used instead.

Figure 9:
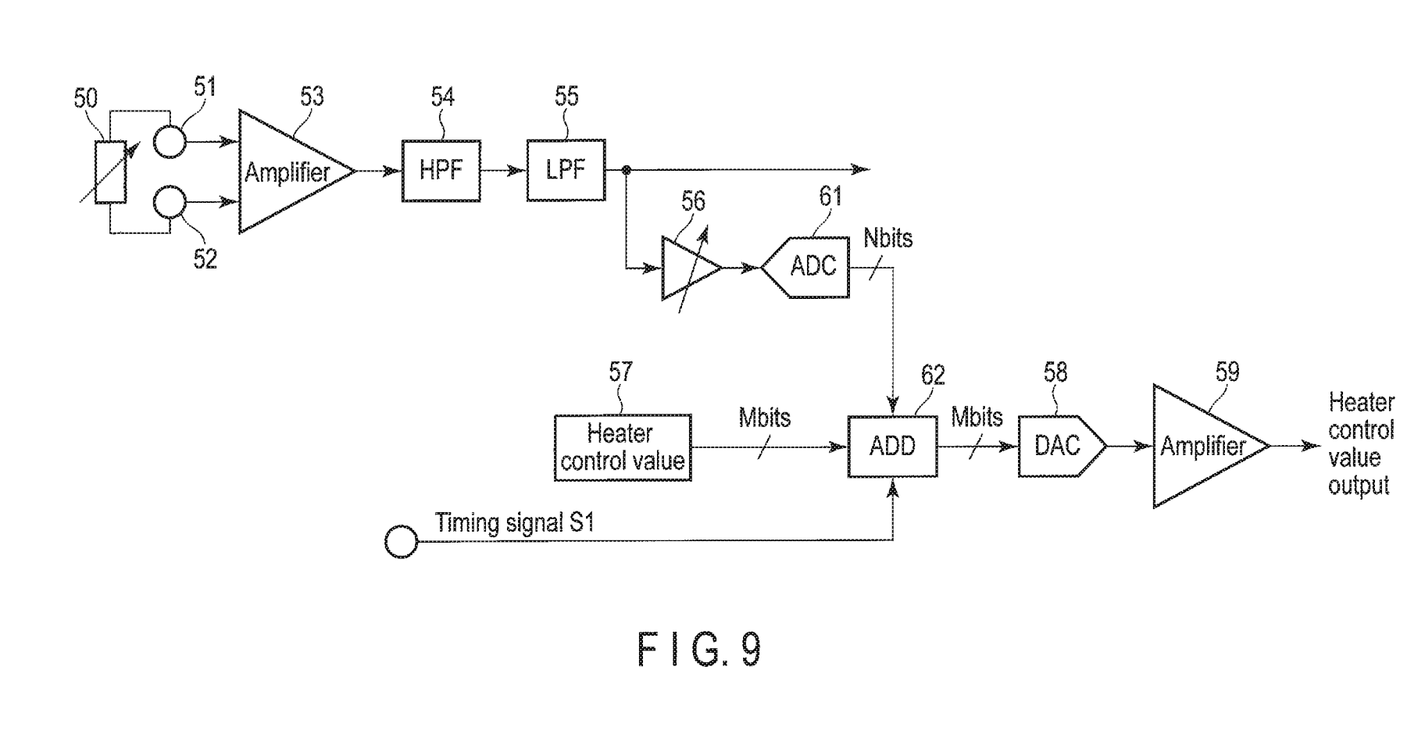
FIG. 9 illustrates an example of the structure of a circuit to control a gap between a head surface and a recording surface of a magnetic disk in a second embodiment.

FIG. 9 illustrates an example of the structure of a circuit which controls a gap between an ABS (head surface) 9 and a recording surface 2A of a magnetic disk 2. In the present embodiment, the circuit is mounted on a head amplifier IC 11; however, the circuit may be disposed in other controller as in the first embodiment.

Output of the gap sensor 50 is input into an amplifier 53 via terminals 51 and 52, and output of the amplifier 53 passes a high pass filter (HPF) 54 and low pass filter (LPH) 55 to be input in a gain adjustor 56 as in the first embodiment. After the gain is adjusted by the gain adjustor 56, the output of the gain adjustor 56 is input into the analogue-digital converter (ADC) 61. The digital output of the ADC 61 is added to a digital output of a heater control value 57 by an adder 62. The digital value of the heater control value 57 with the output of the gap sensor 50 added is converted into an analogue output in the digital-analogue converter (DAC) 58, and is input into an amplifier 59. Then, the converted control output is output from the amplifier 59 as a control output for controlling expansion of the heater 28.

A timing signal S1 is a signal to match a time of adding an output of the heater control value 57 and a gain corresponding to an output of the gap sensor 50 by the adder 62. The control of matching the time using the timing signal S2 is performed, for example, per one servo frame or per every two servo frame. In a case where the time is matched as above, a process of averaging a digital value based on the output of the gap sensor 50 may be performed, and the averaged digital value may be input in the adder 62 during an update interval of the heater control value 57. The circuit structured as above can achieve a similar effect as in the first embodiment.

Furthermore, during write of data, noise may be found in the output of the gap sensor 50. Thus, the output value of the gap sensor 50 may be subjected to a masking process in the write operation. Whether or not it is in the write operation will be determined, for example, based on a write gate turned on. The write gate is an instruction to write data to the magnetic disk 2, and on/off of the write gate is, for example, transferred to the head amplifier IC 11 from the R/W channel 12.

Third Embodiment

In the first and second embodiment, a gain (adjustment value) based on the output of the gap sensor 50 is added to the control value of the heater 28 in a dynamic manner during the write operation, and the operation of the heater 28 is controlled, and in a third embodiment, the magnetic disk device 1 stores a gain to be added to a control value in a register, and adds the gain stored in the resister to a control value of the heater 28 to control the heater 28.

Figure 10:
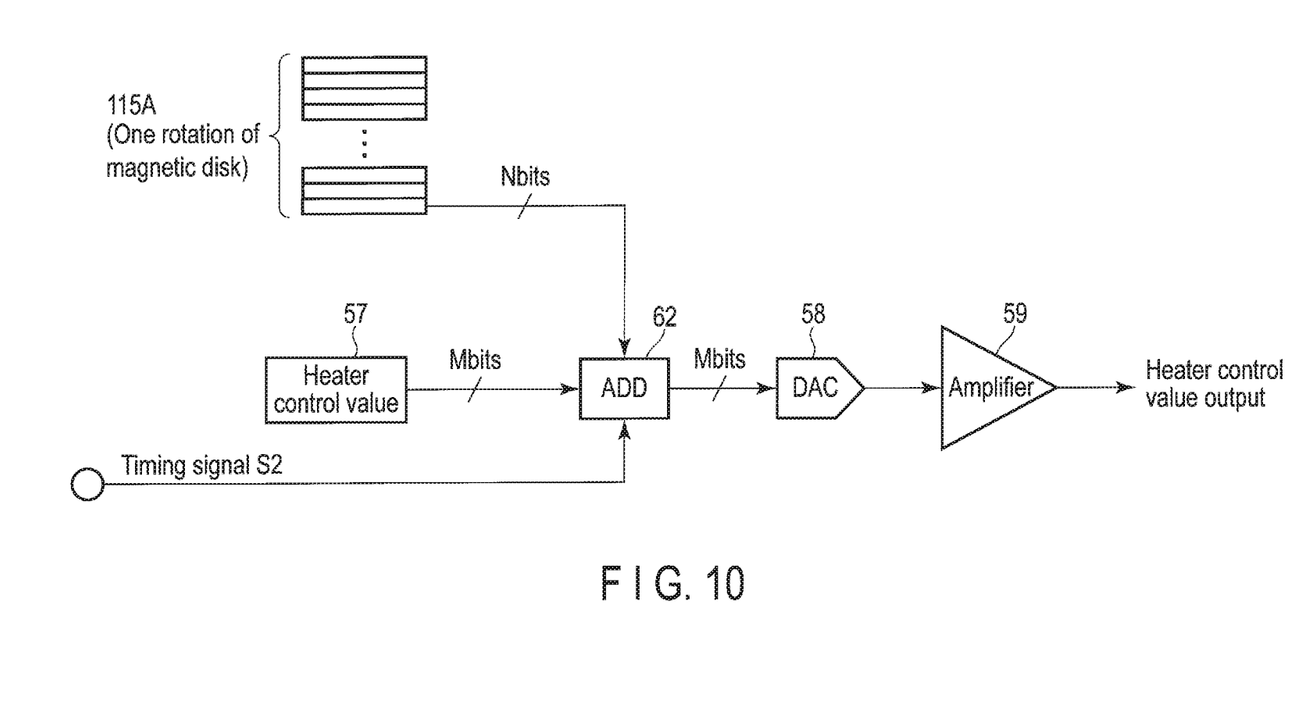
FIG. 10 illustrates an example of the structure of a circuit to control a gap between a head surface and a recording surface of a magnetic disk in a third embodiment.

FIG. 10 illustrates an example of the structure of a circuit to control an ABS (head surface) 9 and a recording surface 2A of a magnetic disk 2. In the present embodiment, the circuit is mounted on a head amplifier IC 11; however, the circuit may be disposed in other controller as in the first and second embodiments.

A gain added to the control value of the heater 28 is stored in a register 115A as a gain per one servo frame or per every two servo frame during one rotation of the magnetic disk 2, for example. The gain stored in the register 115A is preliminarily measured using the gap sensor 50 or the like and is stored in the register 115A. Then, at a time of reading the servo data from the magnetic disk 2 by the read head 10R, the gain is read from the register 115A corresponding to the head 10 and a track, for example, in synchronization with turning on of the servo gate. The gain read is added, during the write operation, to a control value 57 of a heater 28 read from a control value storage 114A by an adder 63, and the added value is converted by a digital-analogue converter (DAC) 58. Then, the converted control output is output by the amplifier 59 as a control output for controlling expansion of the heater 28.

The number of register 115A will be, if the number of servo frames is six hundreds during one rotation of the magnetic disk 2, six hundreds necessary while the heater 28 is controlled per servo frame, and three hundreds necessary while the heater 28 is controlled per every two servo frame. With such a structure, a similar effect as in the above embodiments can be achieved as well. Furthermore, a process to add an output from the gap sensor 50 in the write/read operation can be omitted because a gain is preliminarily stored in the register 115A, and a gap can be adjusted even if there is an abnormality in the circuit including the gap sensor 50. Note that which of the radius positions of the magnetic disk 2 is used to obtain a gain of one rotation may be set optionally.

Furthermore, in the present embodiment, a gain of one rotation from an optional one radius position of the magnetic disk 2 is stored in a register; however, several radius positions may be set in a radius direction, for example, and a gain per certain servo frame number of one rotation may be stored in the register per radius position.

Figure 11:
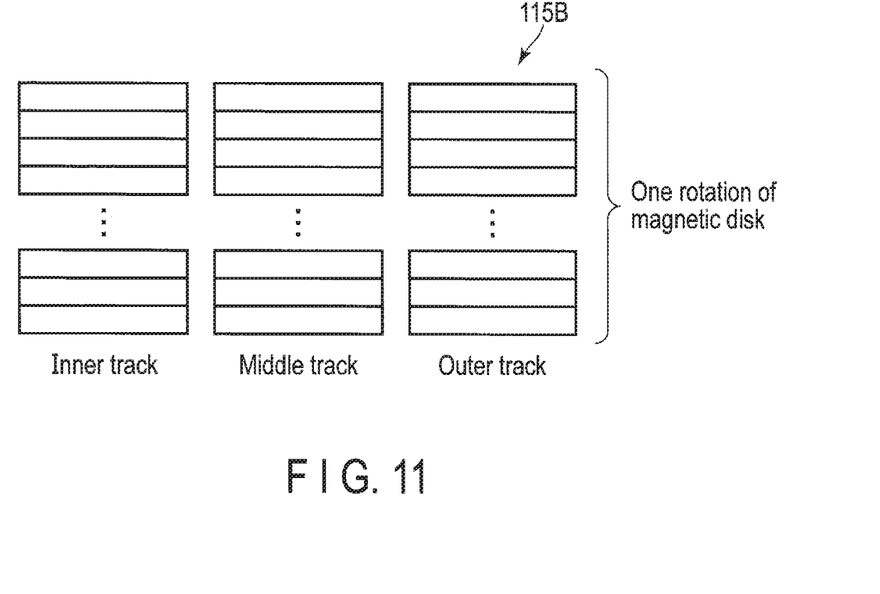
FIG. 11 illustrates an example of the structure of a resistor in a case where several radius positions are set in the third embodiment.

FIG. 11 illustrates an example of the structure of a register in a case where several radius positions are set.

In this example, three radius positions are set as the several radius positions, and a gain per certain servo frame number is stored in the register from the three radius positions. In the example of FIG. 11, certain radius positions of inner track, middle track, and outer track of the magnetic disk 2 are set, and a register 115B to store a gain corresponding to the three radius positions is provided. When a gain of one rotation is stored in different radius positions is stored, even if characteristics of the gap between an ABS 9 of a head 10 and a recording surface 2A of the magnetic disk 2 are different in the radius positions, the gap between the ABS 9 and the recording surface 2A can be minimized in the write/read operation.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:
1. A magnetic disk device comprising:
a magnetic disk;
a magnetic head including a read head to read data from the magnetic disk and a write head to write data to the magnetic disk; and
a controller configured to control read/write from/to the magnetic disk by the magnetic head, wherein
the magnetic head includes a thermal actuator configured to project a head surface of the magnetic head to a recording surface of the magnetic disk, and a detector configured to detect a gap between the head surface and the recording surface of the magnetic disk, and the controller controls a degree of projection of the magnetic head to the recording surface by the thermal actuator corresponding to the gap detected by the detector during the read/write.

2. The magnetic disk device of claim 1, wherein the controller includes am amplifier configured to amplify an output of the detector, and an adder configured to add the output amplified by the amplifier to a control output of the thermal actuator, and the head surface of the magnetic head is projected to the recording surface corresponding to the control output of the thermal actuator added by the adder.

3. The magnetic disk device of claim 1, wherein the controller includes:

an amplifier configured to amplify an output of the detector;

an analogue-digital converter configured to convert the output amplified by the amplifier;

an adder configured to add the output converted by the analogue-digital converter to a control output of the thermal actuator; and a digital-analogue converter configured to convert the control output of the thermal actuator with the addition by the adder to analogue from digital, wherein the head surface of the magnetic head is projected to the recording surface corresponding to the control output of the thermal actuator output from the digital-analogue converter.

4. The magnetic disk device of claim 1, wherein the magnetic disk includes a plurality of positioning data used for positioning of the magnetic head, and the controller includes a storage configured to store an adjustment value of the thermal actuator corresponding to a position indicated by the positioning data, reads the adjustment value from the storage, the value corresponding to the position indicated by the positioning data read by the read head from, adds the read adjustment value to the control output of the thermal actuator, and moves the head surface of the magnetic head to be projected to the recording surface based on the control output of the thermal actuator with the adjustment value added.

5. The magnetic disk device of claim 4, wherein the storage stores an adjustment value of the thermal actuator corresponding to the position indicated by the positioning data per radius position of the magnetic disk.

6. The magnetic disk device of claim 1, wherein the detector is formed of a certain material, and based on a change in a resistance of the material when the magnetic head is projected, detects a gap between the head surface of the magnetic head and the recording surface.

7. The magnetic disk device of claim 1, wherein the detector is formed of a certain material, and based on a change in a capacitance of the material when the magnetic head is projected, detects a gap between the head surface of the magnetic head and the recording surface.

8. The magnetic disk device of claim 1, wherein the controller is a head amplifier controller configured to control input/output of the magnetic head, and the head amplifier controller is disposed between read/write circuits configured to encode a read signal output from the magnetic head or to decode an encoded write signal to be output to the magnetic head.

* * * * *